Sept. 9, 1924.
H. RICHARDSON
CORNER LOCK FOR BEDSTEADS
Filed Dec. 5, 1921    6 Sheets-Sheet 3
1,508,298
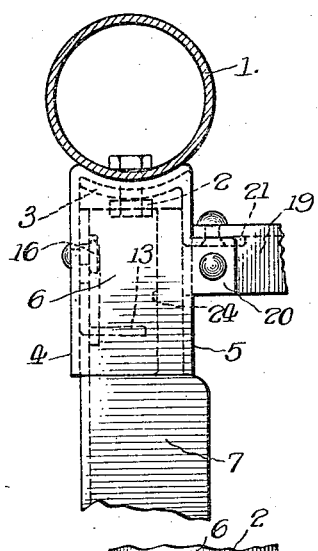
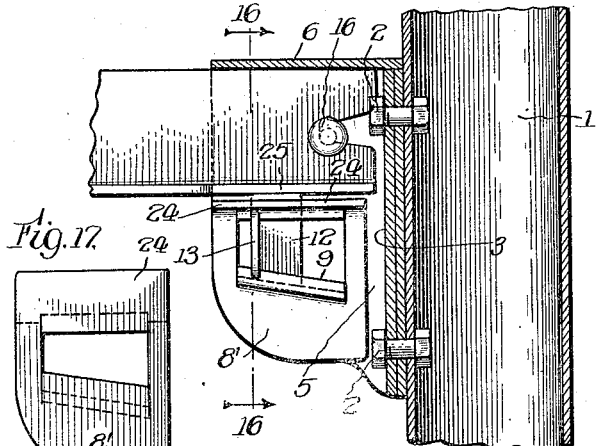
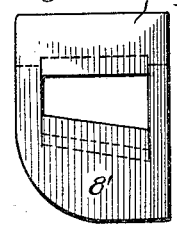
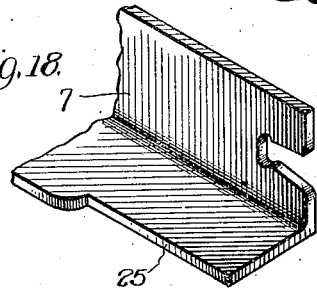
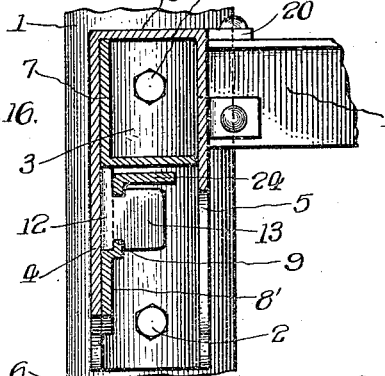
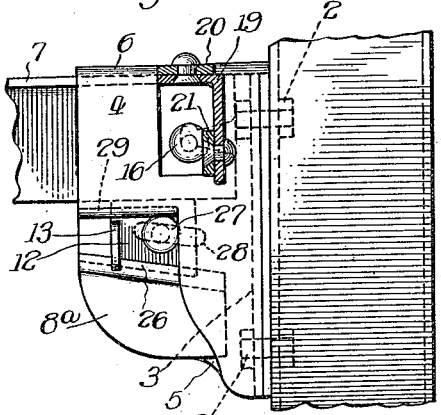
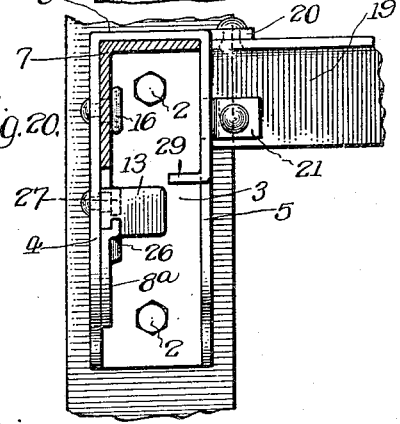
Witness:
G. J. Sauser
Inventor:
Henry Richardson
By Samuel N. Pond
Atty

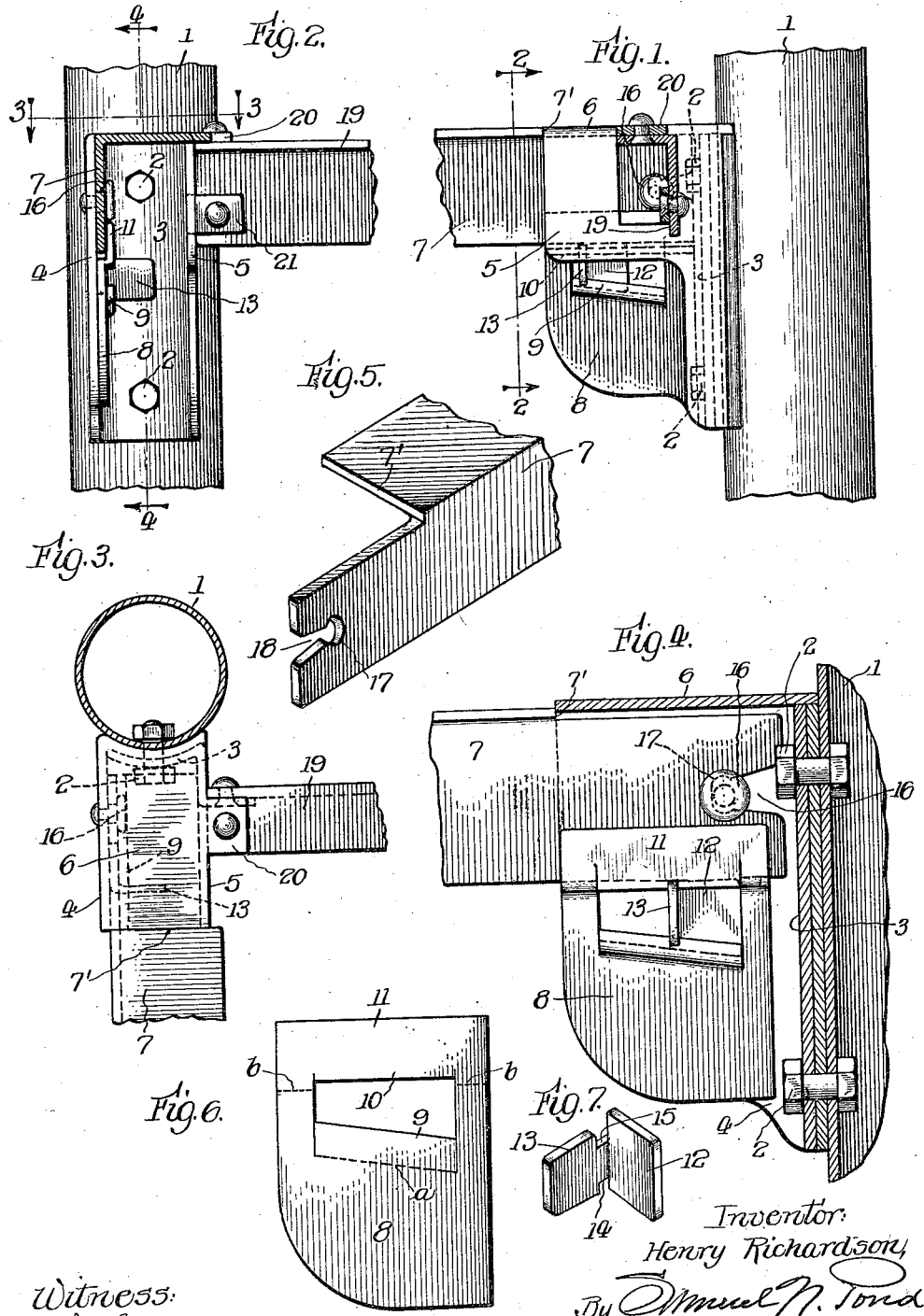

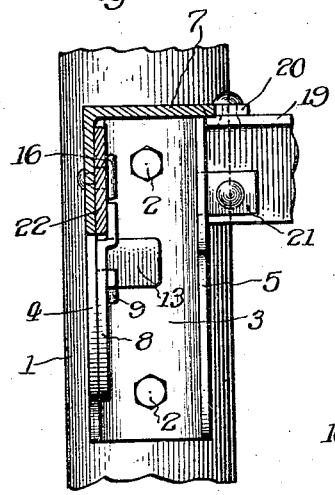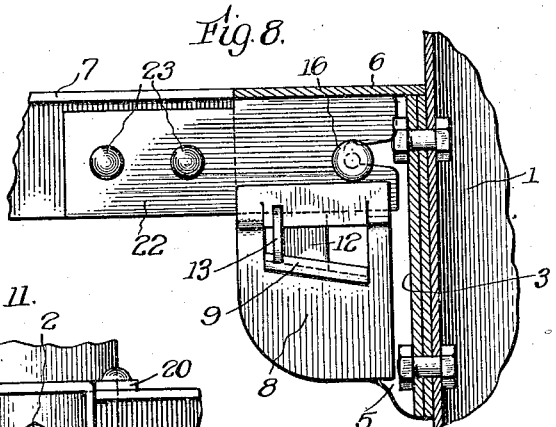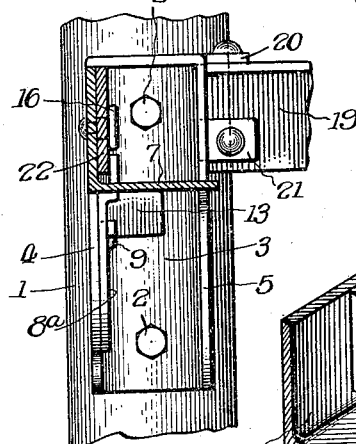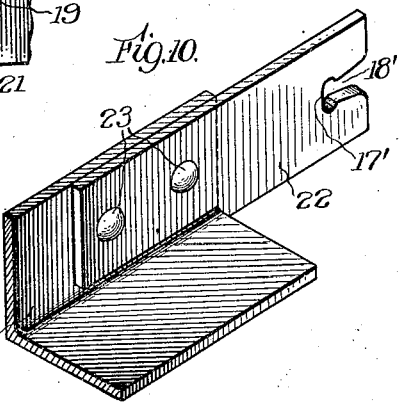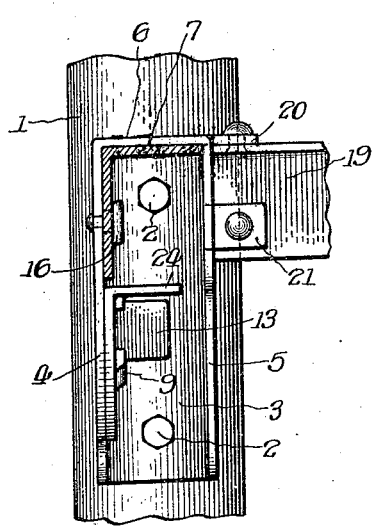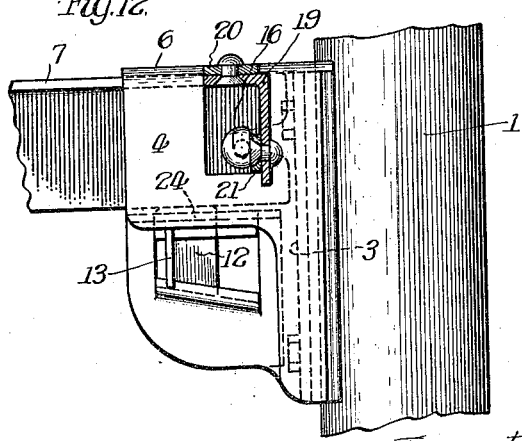

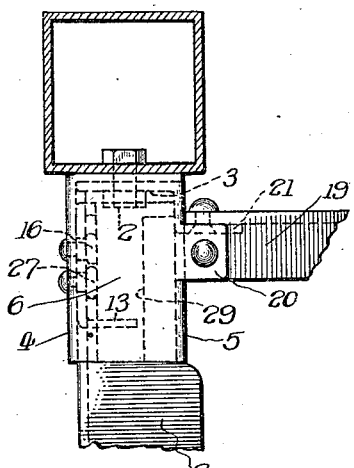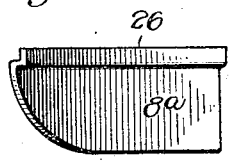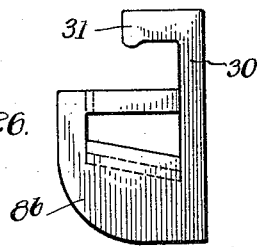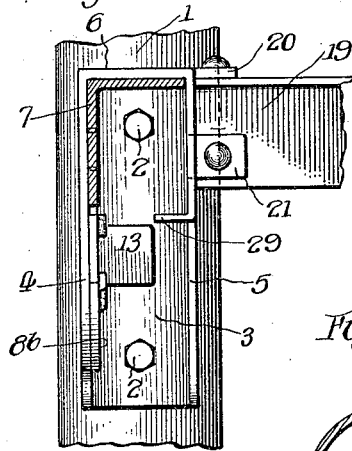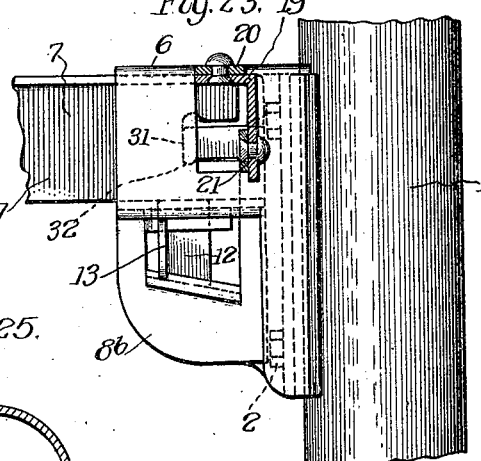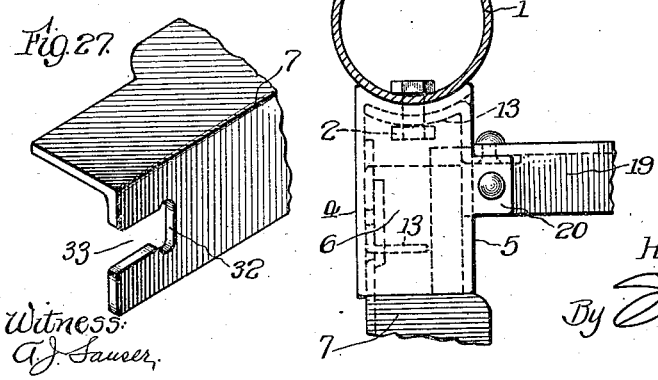

Sept. 9, 1924.  
H. RICHARDSON  
CORNER LOCK FOR BEDSTEADS  
Filed Dec. 5, 1921  
1,508,298  
6 Sheets-Sheet 5
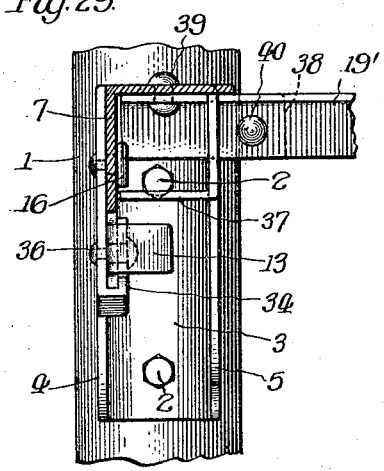
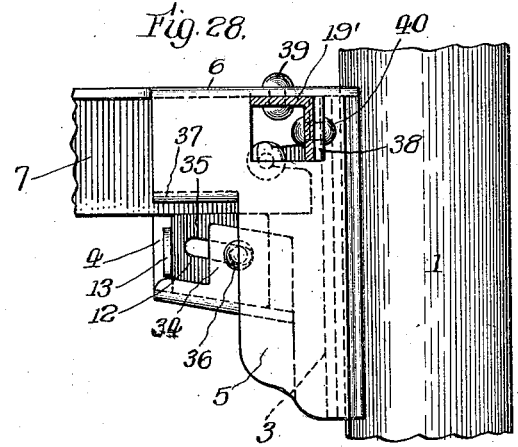
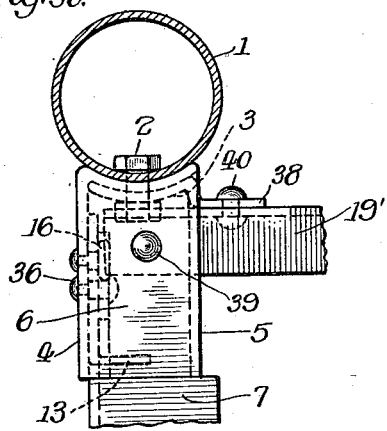
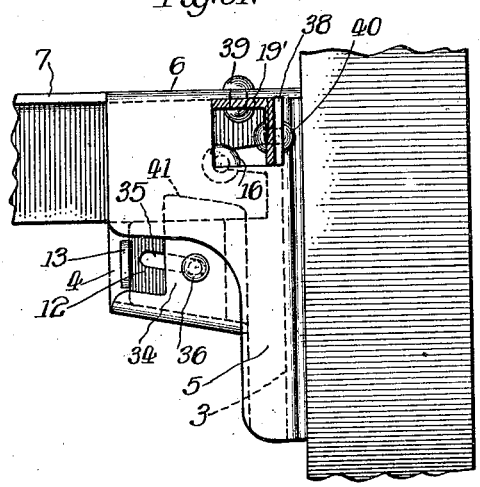
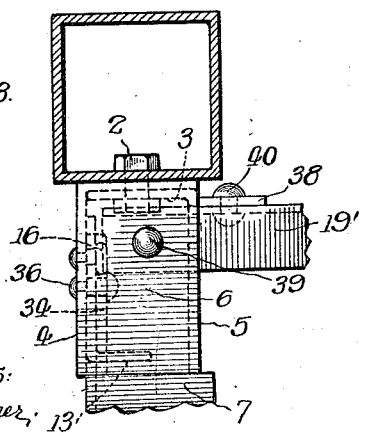
Inventor:  
Henry Richardson,  
By Samuel N. Town, Atty.

Sept. 9, 1924.  
H. RICHARDSON  
CORNER LOCK FOR BEDSTEADS  
Filed Dec. 5, 1921  
1,508,298  
6 Sheets-Sheet 6
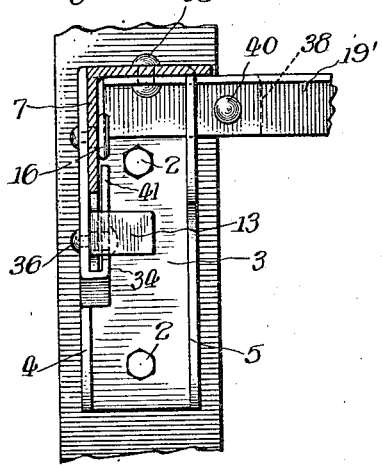
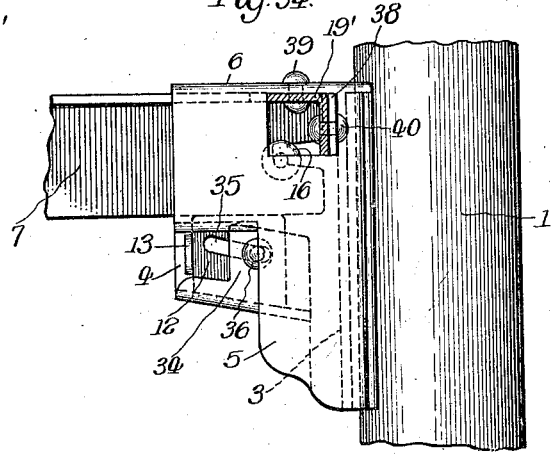
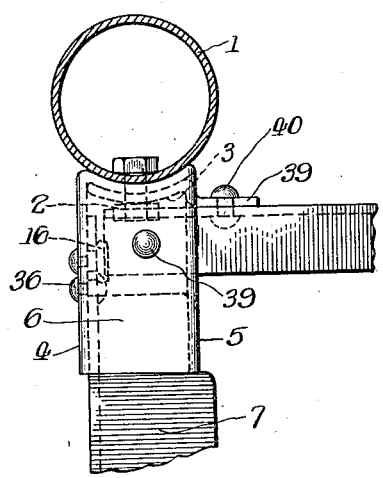
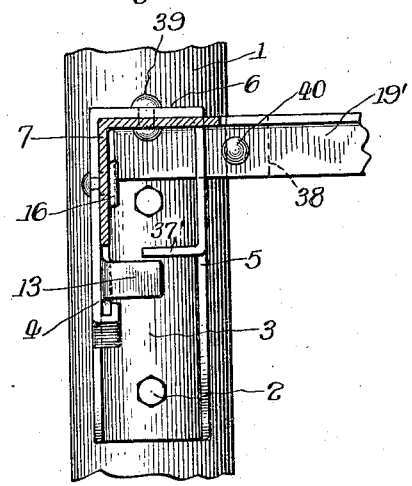
Witness:
A. J. Sauser
Inventor:
Henry Richardson,
By Samuel N. Pond
Atty.

Patented Sept. 9, 1924.

1,508,298

UNITED STATES PATENT OFFICE.

HENRY RICHARDSON, OF CHICAGO, ILLINOIS.

CORNER LOCK FOR BEDSTEADS.

Application filed December 5, 1921. Serial No. 519,872.

*To all whom it may concern:*

Be it known that I, HENRY RICHARDSON, a subject of the King of Great Britain, residing at Chicago, in the county of Cook and State of Illinois, have invented certain new and useful Improvements in Corner Locks for Bedsteads, of which the following is a specification.

This invention pertains to improvements in what are commonly known as corner locks for bedsteads, including the instrumentalities by which the side or end rails, or both, of a bedstead frame, or a spring frame, are separably united to the corner posts of the bed frame. The present invention is of that general type which employs a bracket secured to the corner post and adapted to receive the end, or end attachment member, of a side rail, and means for separably locking the rail end or end attachment member to the bracket. Numerous structures of this general type have heretofore been proposed, many of which are unduly complicated and expensive to manufacture. One object of the present invention is to provide a structure of this class characterized by simplicity, low cost, and reliability and efficiency.

Another object is to provide new and improved means for rigidly and securely locking the side rail or its attachment member to the bracket in such a manner as to both maintain the perfect rectangular relation in a vertical plane of the side rail and corner post under all strains and stresses, and also to obviate any possibility of displacing the side rail from the bracket when pulling or pushing the bedstead over the floor. A still futher object of the invention is to provide an improved structure of corner bracket, side rail attachment and locking means that will permit the side rails to be inverted so as to support either a bed spring frame or slats.

Other objects and attendant advantages of the invention will be apparent to persons skilled in the art as the same becomes better understood by reference to the following detailed description, taken in connection with the accompanying drawings, wherein I have illustrated several specific forms or embodiments of the principle of the invention, and in which—

Fig. 1 is a side elevation of my improved corner bracket shown applied to a corner post, and with the side and end rails secured thereto by my improved locking means;

Fig. 2 is a vertical section on the line 2—2 of Fig. 1;

Fig. 3 is a horizontal section on the line 3—3 of Fig. 2;

Fig. 4 is a vertical section on the line 4—4 of Fig. 2;

Fig. 5 is a perspective view of one end of a side rail cut and shaped to engage with the corner bracket and locking device in upright or inverted position;

Fig. 6 is a plan view of a sheet-metal blank from which is shaped a wedge-guiding member that is attached to the inner side of one of the side plates of the bracket, and cooperates with a wedge that clamps the end of the side rail in the bracket;

Fig. 7 is a perspective view of the sliding wedge member and its handle;

Figs. 8 and 9 are views corresponding to Figs. 4 and 2, respectively, showing a construction employing an end extension member of the side rail adapting the latter to be supported and locked in either upright or inverted position;

Fig. 10 is a perspective view of a fragment of the side rail and the end attachment member thereof that enters the bracket;

Fig. 11 is a view similar to Fig. 9, but showing the side rail applied in inverted position;

Figs. 12, 13 and 14 are views corresponding to Figs. 1, 2 and 3, showing a modification of the wedge guide attachment;

Fig. 15 is a vertical longitudinal section of the structure shown in Figs. 12, 13 and 14, but with the side rail applied in inverted position;

Fig. 16 is a sectional view taken on the line 16—16 of Fig. 15;

Fig. 17 is a plan view of the sheet-metal blank from which the wedge-guiding and supporting member of Figs. 12 to 16 is formed;

Fig. 18 is a perspective view of one end of a side rail shaped to cooperate with the bracket and locking devices of Figs. 12 to 16 inclusive;

Figs. 19, 20 and 21 are views corresponding to Figs. 1, 2, and 3, respectively showing a further modification of the bracket and wedge-guiding and supporting means;

Fig. 22 is a perspective view of the lower wedge-guide and support of Figs. 19 to 21;

Figs. 23, 24 and 25 are views corresponding to Figs. 1, 2 and 3 showing a construction wherein the wedge-guiding and supporting member and the auxiliary lock are formed in one piece;

Fig. 26 is a plan view of a sheet-metal blank from which the combined wedge guide and auxiliary lock are formed;

Fig. 27 is a perspective view of one end of a side rail notched to cooperate with the auxiliary lock of Figs. 23 to 26;

Figs. 28, 29 and 30 are views corresponding to Figs. 1, 2 and 3 showing a construction wherein the wedge guiding member is formed integrally from a side wall of the bracket, and also showing a rail guiding member formed integrally with a side wall of the bracket, and an end rail attaching means wherein the end of the end rail enters the bracket;

Figs. 31, 32 and 33 are views corresponding to Figs. 28, 29 and 30 and showing a modification of the latter in respect of the side rail guiding means;

Figs. 34, 35 and 36 are views corresponding to Figs. 31, 32 and 33, showing a further modification adapted to support and lock the side rail in both upright and inverted position;

Fig. 37 is a perspective view of one end of a side rail shaped to cooperate with the bracket and locking devices of Figs. 34, 35 and 36.

The present invention is of that type which employs a bracket, preferably of the box-like type, on the corner post, and a side rail of either the bedstead frame, or a bed spring frame, having an end, or end attachment thereof, engaged with a bracket; and the novel features relate mainly to improved means for removably securing the side rail, or rail attachment, to the bracket; said securing means being designed to permit the end portion of the rail to be securely locked to the said bracket by means of a clamping member supported on the bracket and preferably engaged with the lower edge of the side rail or its attachment whereby to force the latter upwardly and clamp it tightly against the top of the bracket; there being preferably employed, in cooperation with said clamping member, auxiliary locking devices on the bracket and side rail or side rail attachment which are automatically brought into interlocking relation upon such rising movement of the rail or rail attachment.

The rail locking means have been designed with a view to simplicity and economy of construction, ease of manipulation, and efficiency, particularly in the direction of providing a strong and rigid joint between the side rail and corner bracket which will effectively resist angular strains in a vertical plane and the pulling out strains caused by pushing or pulling the bedstead over the floor.

Referring first to the form of the invention illustrated in Figs. 1 to 7 inclusive, 1 designates a round corner post of a bed frame, to which is rigidly attached, as by bolts 2, a corner bracket of the general box bracket type, preferably made of sheet-metal and comprising a rear attaching wall 3, herein shown as of double thickness, outer and inner side walls 4 and 5, and a horizontal top wall 6. 7 designates the side rail of angular form, the horizontal limb of which is cut away at the ends, as shown at 7' in Fig. 5 to abut against the outer end of the bracket plate 6, as shown in Fig. 3, while the vertical limb extending beyond the end of the horizontal limb enters the bracket, lying in contact with the inner side of the outer side wall 4.

To the said inner side of the side wall 4 is strongly attached, as by electric fusing, a sheet metal member that is cut and shaped to provide a guide for a wedge shaped key hereinafter referred to and likewise a guide for the vertical limb of the side rail. Fig. 6 shows the sheet metal blank designated as an entirety by 8. This blank is suitably cut to provide an inclined lip 9 inwardly offset on the dotted line "a", and a narrow depending upper lip 10 on the lower edge of an offset upper portion 11 bent outwardly and upwardly on the dotted lines "b". Referring to Fig. 7, 12 designates a wedge-shaped key having an inclined lower edge that is slidably mounted in the channel formed by the base of the offset lip 9. This wedge is provided with an operating finger piece or handle 13, the upper and lower edges of which are formed with notches 14 and 15 that slidably engage with the lips 9 and 10, respectively, to confine the key in position. The upper edge of the wedge key slidably engages with the lower edge of the vertical limb of the side rail 7, and, as said key is drawn forwardly, or to the left in Fig. 1, forces the rail upwardly into snug engagement with the top plate of the bracket, and owing to the low inclination of the wedge, frictionally holds it in said position. The offset upper portion 11 of the key guide also constitutes, in association with the adjacent side wall of the bracket, a guide and lateral support for the vertical limb of the side rail, as clearly shown in Fig. 2.

For the purposes of a practical corner lock, the device thus far described is complete; but in association with the wedge key I may employ an auxiliary lock which is automatically brought into locking condition by the upward wedging of the side rail in the manner described. This auxiliary lock may comprise a headed stud 16 secured in the outer side wall 4 of the bracket, and a cooperating notch 17 (Fig. 5) formed in the vertical limb of the side rail 7, with an entrance slot 18 leading into said notch through the outer end of the rail. As the latter is entered in the bracket, the slot 18 passes over the stud, and as the rail is raised by the wedge key, the stud is brought into interlocking relation with the notch 17 in the manner clearly shown in Fig. 1.

For the attachment of an angle end rail 19 I have shown horizontal and vertical attachment lugs 20 ad 21, respectively, cut and bent outwardly from the inner side wall 5, but this feature forms no part of the present invention. It will be observed that the lower portion of the inner side wall 5 of the bracket is cut away sufficiently to afford ready access of the thumb and finger to the knob or handle of the wedge key for manipulating the latter.

In Figs. 8, 9, 10 and 11, I have illustrated a construction of corner bracket and rail locking devices identical with those already described, but the side rail 7, instead of having an integral end portion of its vertical limb engaged within the bracket, is provided with an attachment in the form of an end extension member 22 (Fig. 10) attached to the vertical limb of the rail 7 as by rivets 23, said extension member entering the bracket and cooperating with the described locking devices in either the upright position of the side rail illustrated in Figs. 8 and 9, or the inverted position illustrated in Fig. 11, for which purpose the locking notch 17′ and entrance slot 18′ are located mid-height of the extension member 22 so as to engage with the stud 16 in either position of the rail.

In Figs. 12 to 18 inclusive I have illustrated a structure designed to accommodate the side rail in inverted position as well as in upright position, and without necessitating the complete cutting off of the horizontal limb of that portion of the rail which enters the bracket. In this construction, the upper portion of the attachment member 8′ (Fig. 17) which forms the guide for the wedge key, instead of being vertical and constituting a guide for the vertical limb of the rail, is bent down into a horizontal plane, as shown at 24, and forms a rest or support for the horizontal limb of the side rail when the latter is applied in inverted position, as shown in Figs. 15 and 16. To accommodate the horizontal limb of the rail to the width of the bracket, the former is narrowed by trimming off a portion of its free edge as shown at 25 in Fig. 18, so that it fits between the side walls of the bracket, as shown in Figs. 13 and 16. Of course, when the wedge is drawn forwardly, the rail is lifted off the supporting ledge 24, as clearly shown in Figs. 15 and 16.

In Figs. 19 to 22 inclusive, I show a modification of the wedge guiding and supporting means. In this construction the attachment member 8$^a$ is formed with an inclined offset lip 26 (Fig. 22), and to confine the wedge key against escape, it is provided with a headed stud 27 that has sliding engagement with an inclined slot 28 formed in the outer side wall of the bracket. In this construction I have also shown the inner side wall of the bracket as provided with an inturned horizontal lip or flange 29 that performs the same function as the horizontal lip or flange 24 shown in Figs. 15 and 16, constituting a temporary support for the horizontal limb of the side rail when the latter is applied in inverted position.

Figs. 23 to 27 inclusive illustrate a construction wherein the key guide attachment plate 8$^b$ carries the auxiliary locking member that cooperates with the notch in the vertical limb of the side rail. This is best shown in Fig. 26, wherein it will be seen that the plate 8$^b$ is formed with an upwardly extending limb 30 terminating in an inwardly extending horizontal hook 31, which lies in the vertical plane of the vertical limb of the side rail 7, which latter is equipped with a notch 32 to engage with the hook 31 and an entrance slot 33 of sufficient width to admit the hook 31 before the side rail is jammed upwardly by the wedge key. The locked relation of the rail to the bracket is clearly shown in Fig. 23. I have also shown this construction equipped with the horizontal supporting ledge 29, said construction accommodating the side rail in either upright or inverted position.

In the structures thus far described, the supporting and guiding member for the wedge key and side rail is disclosed as wholly or in part an attachment to the inner side of the outer wall of the bracket. This construction may be simplified, if desired, by forming such wedge and rail guiding means integrally from the side wall itself of the bracket, and in the remaining figures of the drawings, I have illustrated several forms of such integral supporting and guiding means.

Referring first to Figs. 28, 29 and 30, the lower portion of the outer side wall of the bracket is bent inwardly and upwardly, as shown at 34, forming a guiding and supporting channel for the wedge key, and the latter may be formed with an inclined slot 35 engaged with a stud 36 extending through and between the side walls of the guide channel thus formed. Said stud constitutes a keeper to prevent escape of the key and also binds together the side walls of the channel guide. In this construction I have also shown an inwardly bent lip or flange 37 on the inner side wall of the bracket, the inner edge of which, as shown in Fig. 29, is spaced from the outer side wall of the bracket by substantially the thickness of a side rail, so as to form with the latter a guide for the insertion of the side rail into the bracket. In this construction I have also shown a different attachment of the end rail 19' to the bracket. From the inner side wall of the bracket is cut and bent outwardly a rectangular attachment lug 38, and through the hole thus formed the end of the end rail is entered into the bracket, and its horizontal limb is united to the top plate of the bracket by a rivet 39, while the attachment lug 38 is similarly secured by a rivet 40 to the vertical limb of the end rail.

Figs. 31 to 33 inclusive show a construction generally similar to that shown in Figs. 28 to 30, differing therefrom in that the inner side wall 34 of the wedge key guide is extended upwardly, as shown at 41 to a sufficient height to constitute an inner guide for the vertical limb of the side rail or side rail attachment as the latter is entered into the bracket.

Figs. 34 to 37 inclusive show a modification of the structure of Figs. 28 to 30, wherein the inwardly extending horizontal lip or flange 37' on the inner side wall of the bracket, instead of constituting an inner guide for the vertical limb of the side rail is placed lower, and serves the function of a temporary support for the horizontal limb of the side rail when the latter is applied in inverted position, its horizontal limb being narrowed, as shown at 42 to permit its entrance between the side walls of the bracket.

Since the side rail attachment members herein shown are rigidly and permanently fastened to the side rail proper and constitute in effect end portions of the latter, it is to be understood that wherever the ends or end portions of the side rails are referred to in this specification or in the claims, I have meant to designate either integral end portions, or attached end portions, of the side rails. The term side rail as used herein is intended to include either the side rail of a bed frame or the side rail of a bed-spring frame.

It is believed that the foregoing description in connection with the drawings will make clear to those skilled in the art the novel structural features of the present invention and the principle underlying the same. Manifestly the forms shown and described by no means exhaust the structural variations and modifications that are possible within the principle of the invention, but they are believed to be sufficient to make clear the structural and functional advantages which inhere therein. Hence, I do not limit the invention to the specific forms, arrangements and proportions shown in the drawings, but reserve all such variations and modifications as fall within the spirit and purview of the appended claims.

I claim:

1. In a corner lock for bedsteads, the combination of a bracket a side rail end portion engaged with the said bracket, a wedge-shaped member supported by the said bracket and having its wider end facing the inner end of the latter, said wedge-shaped member serving to clamp the said rail end portion to the said bracket by means of an inclined sliding movement outwardly of the said bracket.

2. In a corner lock for bedsteads, the combination of a bracket, an inclined slideway on said bracket, a wedge-shaped key mounted in said slideway and having its wider end facing the inner end of said bracket, a side rail end portion entered in said bracket and clamped thereto by said key, and means for confining the said key in the said slideway.

3. In a corner lock for bedsteads, the combination of a bracket, an inclined slideway on said bracket, a wedge-shaped key mounted in said slideway and having its wider end facing the inner end of said bracket, a side rail end portion entered in said bracket and clamped thereto by said key, and pin-and-slot means for confining the said key in the said slideway.

4. In a corner lock for bedsteads, the combination of a box-like bracket, a side rail end portion engaged within the said bracket, a clamping member mounted on the said bracket and operating to wedge the said rail end portion, under an upward movement, against a horizontal plate of the bracket, and co-operating locking devices on a side wall of the bracket and said side rail end portion brought into interlocked engagement by means of said upward movement of the said rail end portion.

5. In a corner lock for bedsteads, the combination of a bracket comprising a back plate adapted to fit the bed post, outer and inner side walls and a horizontal plate between the said walls, a side rail end portion engaged within the said bracket, a clamping member mounted on the said bracket and between the said side walls of the latter and operating to wedge the said rail end portion, under an upward movement, against the said horizontal plate of the bracket, and co-operating locking devices on said rail end portion and a side wall of the bracket brought into interlocked engagement by means of said upward movement of the said rail end portion, said devices comprising a pin on one of said parts interengaging a slot on the other of said parts.

6. In a corner lock for bedsteads, the combination of a bracket comprising a back plate adapted to fit the bed post, outer and inner side walls and a horizontal plate between the said walls, a side rail end portion engaged within the said bracket, a clamping member mounted on the said bracket and between the said side walls of the latter and operating to wedge the said rail end portion, under an upward movement, against the said horizontal plate of the bracket and co-operating locking devices on said rail end portion and a side wall of the bracket brought into interlocked engagement by means of said upward movement of the said rail end portion, said devices comprising a pin on one of said parts interengaging a slot on the other of said parts, said pin and slot being so disposed as to function in both the upright and inverted positions of the side rail.

7. In a corner lock for bedsteads, the combination of a bracket, a side rail end portion engaged with said bracket, a sliding wedge member mounted on one of said parts and serving to clamp said rail end portion to said bracket, and auxiliary means for locking said rail end portion against displacement from said bracket.

8. In a corner lock for bedsteads, the combination of a box-like bracket, a side rail end portion within said bracket, a sliding wedge member mounted on one of said parts and engaged with the other serving to force said rail end portion upwardly in said bracket, and cooperating locking devices on said bracket and rail end portion respectively brought into interlocked engagement by such upward movement of said rail end portion.

9. In a corner lock for bedsteads, the combination of a box-like bracket, a side rail end portion within said bracket, an inclined slideway on the inner side of a side wall of said bracket, a wedge member mounted in said slideway and operating to force the said rail end portion upwardly in said bracket, and cooperative locking devices on said bracket and rail end portion respectively brought into interlocked engagement by such upward movement of said rail end portion.

10. In a corner lock for bedsteads, the combination of a bracket adapted to receive a side rail end portion in either of two positions, said bracket having an inclined slideway on a side wall thereof, a wedge member on said slide way serving to clamp the said side rail by an upward movement of the latter to the said bracket in either of the said two positions, and cooperating locking devices on the said bracket and side rail respectively brought into engagement by the said upward movement of the side rail.

HENRY RICHARDSON.